Oct. 31, 1944.  R. TAMPIER  2,361,574
AIRCRAFT
Filed July 18, 1940   3 Sheets-Sheet 1

Oct. 31, 1944.  R. TAMPIER  2,361,574
AIRCRAFT
Filed July 18, 1940  3 Sheets-Sheet 2

Oct. 31, 1944.    R. TAMPIER    2,361,574
AIRCRAFT
Filed July 18, 1940    3 Sheets-Sheet 3

Inventor
René Tampier
by A. Knight Lenoad
Attorney

Patented Oct. 31, 1944

2,361,574

UNITED STATES PATENT OFFICE 2,361,574

AIRCRAFT

René Tampier, Cricklewood, London, England

Application July 18, 1940, Serial No. 346,194
In Great Britain February 28, 1940

6 Claims. (Cl. 244—42)

This invention relates to aircraft and in particular to the arrangement and operation of additional surfaces carried on the main wing section thereof.

In order to increase the lift of an aircraft it is known to provide at the leading edge of the wing thereof a small aerofoil which normally fits back into the surface of the main wing section but which can be moved forwardly to increase the lift coefficient of the wing.

The main object of the present invention is to provide a novel arrangement of, and means for operating additional surfaces carried on the main wing section thereof.

A further object of the invention is to provide auxiliary lifting surfaces at the ends of the wing, as near as possible to the line connecting the centres of pressure of the wing (approximately one third of the chord) to assist in maintaining lateral stability.

Yet a further object of the invention is to provide simple and robust mechanism for operating additional surfaces on aircraft.

These and other objects, which will appear more clearly as the specification proceeds, are accomplished by the arrangement and combination of parts set forth in the following detailed description, defined in the appended claims and illustratively exemplified.

In the accompanying drawings in which:

Figures 3 and 4 are sectional detail views illustrating respectively two positions of the clutch mechanism of Figure 2;

Figure 5 is a detail end view illustrating the locking mechanism;

Figures 6 and 7 are respectively front and plan views illustrating the operation of a handwheel;

Figure 11 is a plan detail view of a modification, and,

Figure 1:
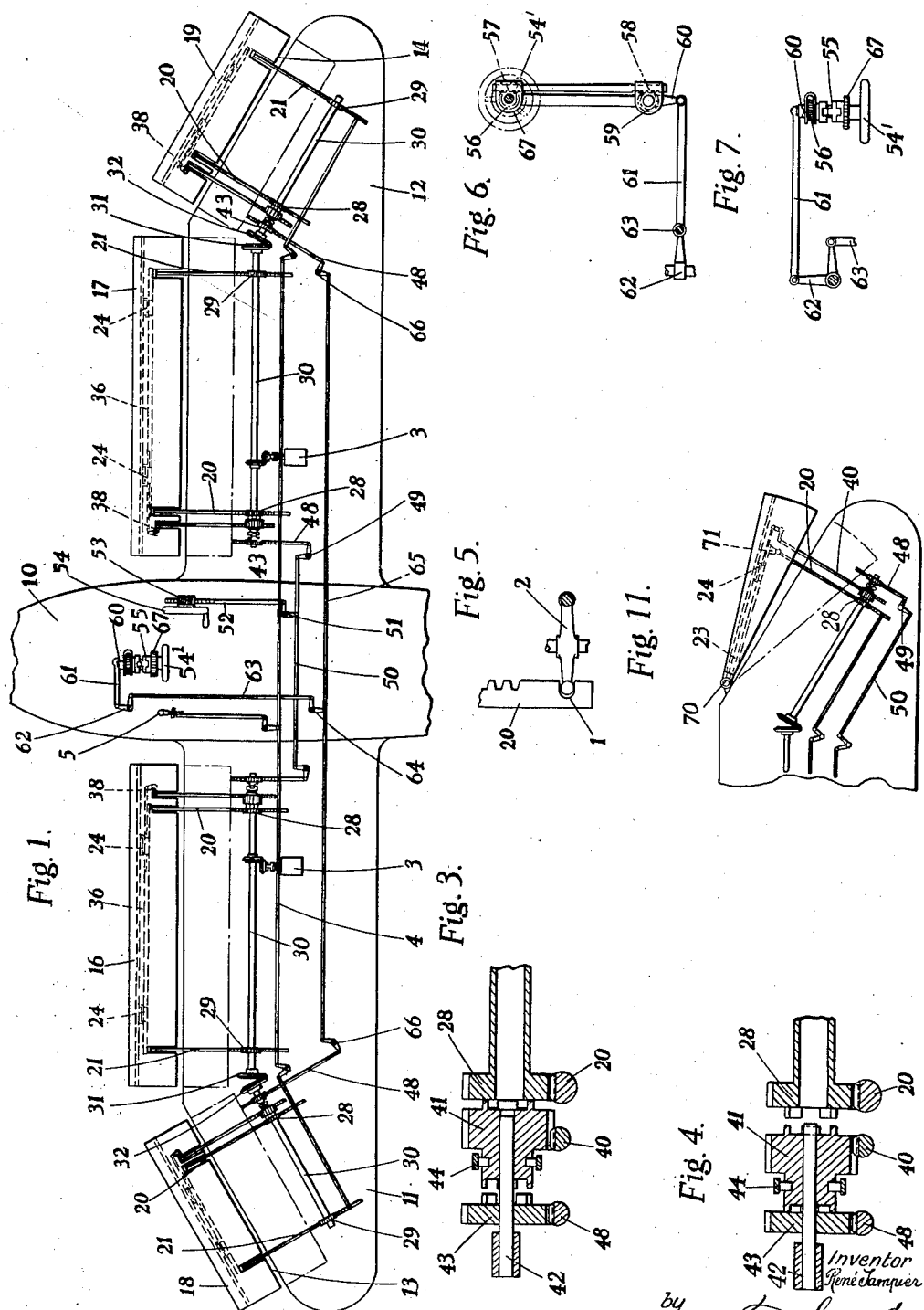
Figure 1 is a diagrammatic plan view of an aeroplane embodying my invention.
Figure 8:
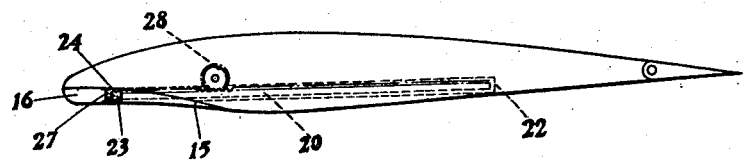
Figures 8 and 9 are diagrammatic views in end elevation illustrating respectively the closed and extended positions of an additional surface carried on a main wing section.
Figure 9:
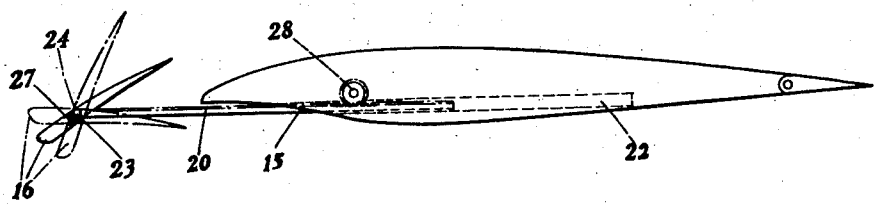

Referring first to Figure 1 the aircraft comprises a fuselage 10, on each side of which is a main wing 11 or 12, the outer ends of which are cut away as at 13, 14. Each main wing 11, 12 is formed on the lower side of its leading edge, between the fuselage 10 and the cut-away ends 13, 14, with a recess 15 in which a small aerofoil 16 or 17 can fit snugly, as shown in Figure 8, and from which it can be advanced in front of the main wing, as shown in Figure 9. The cut-away ends 13, 14 of the wings are formed with similar recesses to receive aerofoils 18 or 19, which can, when desired, similarly be advanced forwardly of the cut-away ends. The incidence of the aerofoils 16—19 relatively to the main wings can be changed when they are in the advanced positions, or during their movement into these positions, as indicated by the various outlines of the aerofoil 16 shown in Figures 9 and 10. The means for effecting the movement and operation of the aerofoils will now be described.

Figure 2:
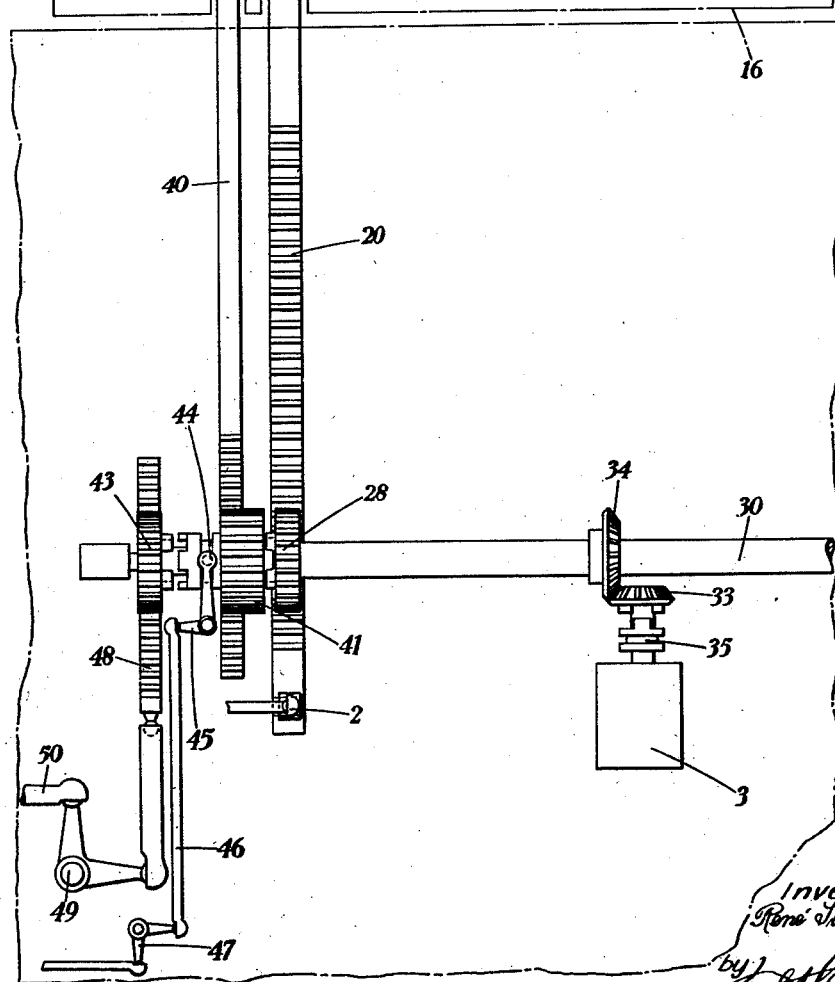
Figure 2 is a partial plan view, on an enlarged scale, illustrating the operating mechanism in greater detail.
Figure 10:
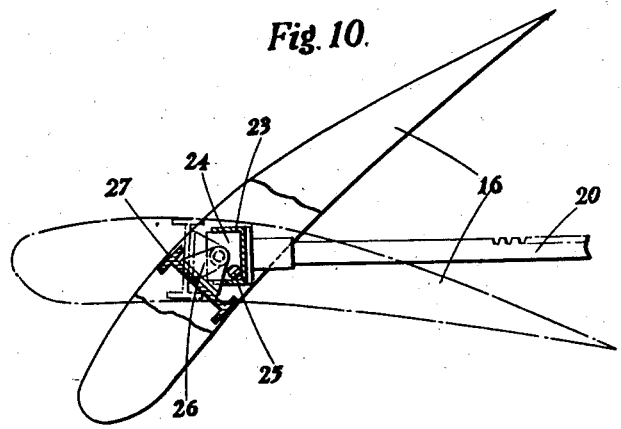
Figure 10 is another diagrammatic view in end elevation and partly in section illustrating the method of connecting an additional surface to the main wing.

Each aerofoil is carried on two racks 20, 21 slidably mounted in guides 22 (Figures 8 and 9) extending transversely of the main wing, the outer ends of the two racks being connected by a spar 23 (Figure 10) which carries two controllable hinges 24, for example, irreversible hinges, of the kind described in my prior U. S. A. specification No. 2,192,871. These hinges consist of a screw which can be turned by a rack to translate a nut across the screw, the nut being operably connected to two arms so as to rock the arms when the nut is translated across the screw. In Figure 10 the rack operating the screw is denoted by the numeral 25, and one of the arms by numeral 26. The arms 26 are fixed to spar 27 extending lengthwise of the aerofoil 16. The racks 20, 21 of each aerofoil 16—19 are engaged by pinions 28, 29 fixed to a shaft 30, the two shafts 30 on each side of the fuselage being connected by bevel pinions 31, 32, so that the drive need only be applied directly to one of the two shafts. The drive may be by hand, but as shown in Figure 2 it is obtained from an electric motor 3 driving bevel pinions 33, 34 through a clutch 35. It will be evident that when the shafts 30 are driven, the pinions 28, 29 will move the racks, and the aerofoils carried thereby, forwardly or rearwardly, according to the direction of the drive. Each rack 20 has a recess 1 (Figure 5) adapted to be engaged by a locking lever 2 operated from the cockpit by a push-pull rod 4 and handle 5 for the purpose hereafter described.

The racks 25 of the two irreversible hinges 24 of each aerofoil 16, 17 are connected by a rod 36, and are adapted to be operated to vary the incidence of the aerofoil by a rod 37 connected to one of the two racks 25, and through a pivoted bell crank lever 38 and link 39, to a rack 40, engaged by a pinion 41 (Figures 2–4). The pinion 41 is slidably mounted on its spindle 42 and is formed on both sides with the elements of a dog clutch, the said elements being adapted to engage, respectively, either with clutch elements on a pinion 43 or with clutch elements carried on the pinion 28, as shown respectively in Figures 3 and 4, the operation being controlled by a clutch fork 44, pivoted bell crank lever 45, rod 46 and pivoted bell crank lever 47, operated by a rod transmission from the cockpit. The pinion 43 meshes with a rack 48 arranged to be operated by a bell crank lever 49, rod 50, bell crank lever 51 (Figure 1) rack 52, which is engaged by a pinion 53, adapted to be rotated by a hand-wheel 54 in the cockpit.

The mechanism for changing the incidence of the two aerofoils 18, 19 is the same as that above described, and as shown in Figure 2, with the exception that a separate hand-wheel 54' is provided and the transmission between the wheel 54' and the rack 48 is modified, this modified transmission being shown in Figures 1, 6 and 7. The transmission is from the hand-wheel 54', through a clutch 55, to pinion 56, racks 57 and 58, pinion 59, bell crank lever 60, rod 61, bell crank lever 62, rod 63, and bell crank lever 64, rod 65, and bell crank lever 66, connected to the rack 48. A second pinion 67, provided on the handle side of the clutch 55, can be utilised if desired to operate the ordinary ailerons. The arrangement is such that the aerofoils 18, 19 are operated in opposite directions to control lateral stability of the machine. Since these aerofoils 18, 19 are only used at low speed, they may be disconnected from the wheel 54' at high speeds by the clutch 55, the wheel 54' being then used only for operating the ailerons. A separate hand-wheel for operating the ailerons may, of course, be provided if desired.

The operation of the apparatus described, is as follows:

At high speeds the aerofoils 16—19 are in the closed positions as shown in Figure 8 and in dotted lines in Figure 1. In this position the upper surfaces of the main wings are perfectly smooth, and there is no line of separation between two surfaces to produce disturbances in the air flow over the wing. At slow speeds, in order to increase the lift of the machine, for example, the aerofoils 16—19 can be advanced into the forward positions as shown in Figure 1. This is effected by starting the motors 3 to drive the shafts 30, the gears 28, 41 being in the positions shown in Figures 2 and 3, so that the racks 20 and 40 are driven forward simultaneously, the incidence of the aerofoils 16—19 relatively to the main wings, in the forward or advanced positions shown in full lines in Figure 1 being as shown in dot and dash lines in Figures 9 and 10, that is, the incidence of these aerofoils is the same as that of the corresponding parts of the main wings. The racks are locked in the forward position by operating the rod 4 to engage the levers 2, in the corresponding slots 1 of the racks. If now, it is desired to vary the incidence of the aerofoils 16, 17 (which, in the present case are to be moved simultaneously in the same direction), in order to improve the efficiency of the wings as a whole, the clutch fork 44 is operated in order to disconnect the pinions 28 and 41, and to connect the two pinions 41 to the corresponding pinions 43, as shown in Figure 4. The hand-wheel 54 is now operated, thus causing the racks 48 to rotate their pinions 43 and consequently the pinions 41, the latter displacing the racks 40 to operate the corresponding levers 38, rods 37 and the racks 25 of the hinges 24, thereby rocking the aerofoils 16, 17 about their hinges, as shown for example in full lines in Figures 9 and 10.

The incidence of the aerofoils 18, 19 can similarly be varied, in their forward positions, in order to provide for lateral stability, by rotating the hand-wheel 54', thereby rocking these two aerofoils about their hinges in opposite directions. As above explained, the ailerons can also be operated simultaneously, and by the same hand-wheel 54' if desired.

If desired the incidence of the surfaces can be changed during their forward or rearward movement by coupling, during or before starting the movement, the pinion 41 with the pinion 43. If, during the movement, the hand-wheel 54 or 54' is held motionless, the rack 40 will not move, and consequently relative movement of the rack 20 will cause the lever 38 to swing around its pivot and thus operate the hinge 24.

The rack and pinion device 41, 43, 44 may be duplicated on the other side of the rack 20 and be utilised for manually controlling small movements of the rack 20, a suitable gear reduction being provided. The incidence of the aerofoils 16, 17 may be changed in the same direction to increase lift or to provide a braking device, when landing. The incidence of these two surfaces may also be changed in opposite directions to control lateral stability.

Although as described above the two hinges 24 are controllable, it is to be understood that only the hinge connected to the lever 38 need be controllable, the other hinge being for example a reversible hinge. The controllable hinge or hinges may also be reversible if desired, for example, by altering the pitch of the screw; or they may be of the kind described in my prior U. S. A. specification No. 2,155,513.

According to the modification shown in Figure 11 the aerofoils 18, 19 may be triangular, the spar 23 of each aerofoil being mounted at one end on a vertical pivot 70. A short connecting rod 71 connects the spar of the aerofoil to the rack 20. The arrangement is such that displacement of the rack 20 swings the surface about the pivot 70. In this form also the aerofoil is rockably mounted on the spar 23 by means of controllable hinges 24 which are operated as above described.

Figure 12:
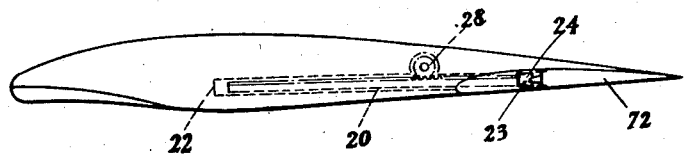
Figure 12 illustrates the application of the operating mechanism to an additional surface carried at the trailing edge of a main wing section.

In Figure 12 the rack mechanism shown in Figures 1 and 2 is applied to control the operation of one or more aerofoils 72 disposed below the trailing edge of a main wing. Such aerofoils may be used either separately or in combination with aerofoils such as 16—19.

The dog clutches described and shown in the drawings may evidently be replaced by other kinds of clutch; they may for example be replaced by friction clutches.

What I claim is:

1. In an aircraft having a main wing section and an auxiliary displaceable lifting surface adapted to assume a retracted position in which it fits into a correspondingly shaped recess of said main wing section, the combination with means for displacing said auxiliary surface from said retracted position to an extended position in which it is clear of said main wing section, said displacing means including at least one support rod slidably mounted in and projecting from said main wing section, means connecting said auxiliary surface hingedly to the projecting end of said support rod, and operator controlled means to move said support rod back and forth, of means for varying the angle of incidence of said auxiliary surface relative to said main wing section including a control rod slidably carried by said main wing section, and projecting therefrom, a device connected to the outer end of said control rod to tilt said auxiliary surface relative to said main wing section when said control rod is displaced relative to said support rod, and drive means for said control rod including a coupling normally causing said control rod to move at the same rate and in the same direction as said support rod, and operator controlled means, operative in any position of said support rod, to release said coupling and to effect a relative movement between said control rod and said support rod.

2. An arrangement, as claimed in claim 1, in which said means for tilting said auxiliary surface relative to said main wing section is capable of being operated by an element displaceable in a plane containing the hinge axis of said auxiliary surface, and both said support rod and said control rod extend and slide in a common plane containing said hinge axis.

3. In an aircraft having a main wing section and an auxiliary displaceable lifting surface adapted to assume a retracted position in which it fits into a correspondingly shaped recess of said main wing section, the combination of means for displacing said auxiliary surface from said retracted position to an extended position in which it is clear of said main wing section, said displacing means including a support rack slidably mounted in and projecting from said main wing section, means connecting said auxiliary surface hingedly to the projecting end of said support rack, an operator controlled drive shaft and a first pinion fixed to said drive shaft and being in permanent mesh with said support rack, and means for varying the angle of incidence of said auxiliary surface relative to said main wing section including a control rack slidably carried by said main wing section and projecting therefrom, a device connected to the other end of said control rack to tilt said auxiliary surface relative to said main wing section when said control rack is displaced relative to said support rack, an operator controlled rotary element disposed coaxially with and at a distance from said first pinion, an axially shiftable and rotatable second pinion disposed between and coaxially with said first pinion and said rotary element, said second pinion being in permanent mesh with said control rack, coupling elements on opposite sides of said second pinion and on the adjacent sides of said first pinion and rotary element, respectively, and operator controlled means whereby said second pinion may be shifted alternatively into engagement with said first pinion thereby causing said control rack to move at the same rate and in the same direction as said support rack, or with said rotary element to effect relative movements between said control rack and said support rack.

4. An arrangement, as claimed in claim 3, in which said rotary element is a third pinion and an operator controlled rack serves to control said third pinion.

5. In an aircraft having a main wing section cut away at an oblique angle near its outer end to form a positively raked wing tip and an auxiliary displaceable lifting surface adapted to assume a retracted position in which its outer edge is disposed substantially parallel to and inwardly of the edge of the positively raked wing tip and an extended position in which its inner edge is disposed substantially parallel to and outwardly of said edge of said positively raked wing tip, the combination with means for displacing said auxiliary surface from said retracted to said extended position, said displacing means including at least one support rod slidably mounted in and projecting from said main wing section, means connecting said auxiliary surface hingedly to the projecting end of said support rod, and operator controlled means to move said support rod back and forth, of means for varying the angle of incidence of said auxiliary surface relative to said main wing section including a control rod slidably carried by said main wing section and projecting therefrom, a device connected to the outer end of said control rod to tilt said auxiliary surface relative to said main wing section when said control rod is displaced relative to said support rod, and drive means for said control rod including a coupling normally causing said conrtol rod to move at the same rate and in the same direction as said support rod, and operator controlled means, operative in any position of said support rod, to release said coupling and to effect a relative movement between said control rod and said support rod.

6. An aeroplane, as claimed in claim 5, in which said auxiliary surface has a substantially triangular shape, vertical pivots being provided on which said auxiliary surface is mounted and about which it can be swung into its retracted or extended position.

RENÉ TAMPIER.